United States Patent [19]

Jensen

[11] 4,228,618
[45] Oct. 21, 1980

[54] ROTARY DISC SANDER WITH TILTABLE WORK SUPPORT TABLE AND SANDER DUST COLLECTION UNIT

[75] Inventor: Flemming E. Jensen, Portland, Oreg.

[73] Assignee: Industrial Patterns & Molds, Inc., Portland, Oreg.

[21] Appl. No.: 1,954

[22] Filed: Jan. 8, 1979

[51] Int. Cl.³ .............................................. B24B 41/06
[52] U.S. Cl. ................................. 51/125.5; 51/240 A; 51/270; 51/273; 144/2 R; 144/129
[58] Field of Search .................. 51/125, 125.5, 216 A, 51/240 R, 240 A, 268, 270, 273; 248/405, 406, 418, 371; 269/71; 83/701; 144/2 R, 129; 409/224

[56] References Cited

U.S. PATENT DOCUMENTS

| 155,734 | 10/1874 | Klaber | 51/240 A |
|---|---|---|---|
| 252,063 | 1/1882 | Taplin | 51/240 A X |
| 431,525 | 7/1890 | Mattison | 51/240 A |
| 1,023,620 | 4/1912 | Burge | 248/405 X |
| 1,029,882 | 6/1912 | Miller | 51/216 A |
| 1,244,584 | 10/1917 | Carter | 51/273 X |
| 1,404,605 | 1/1922 | Hansen | 51/125 X |
| 1,783,426 | 12/1930 | Huntley | 248/406 |
| 2,054,932 | 9/1936 | Fleming | 51/273 |
| 2,741,880 | 4/1956 | Falls | 51/240 A X |
| 2,789,404 | 4/1957 | Downing et al. | 51/273 |
| 3,971,164 | 7/1976 | Albin et al. | 51/273 X |

FOREIGN PATENT DOCUMENTS

| 46924 | 9/1888 | Fed. Rep. of Germany | 248/405 |
|---|---|---|---|
| 1103782 | 11/1955 | France | 248/405 |

Primary Examiner—Gary L. Smith
Assistant Examiner—Robert P. Olszewski
Attorney, Agent, or Firm—Eugene D. Farley

[57] ABSTRACT

The combination of a rotary disc sander comprising a base and a motor-driven, vertically arranged sander disc mounted on the base, with a horizontally arranged tiltable work support table. The table assembly includes a table, pivotal table mounting means mounting opposite side margins of the table to the base, and table tilting screw means connected to the front margin of the table, thereby affording a three point suspension. A sander dust collection shroud encircles the disc and communicates through a baffled duct with a vacuum exhaust system for the sander dust.

8 Claims, 6 Drawing Figures

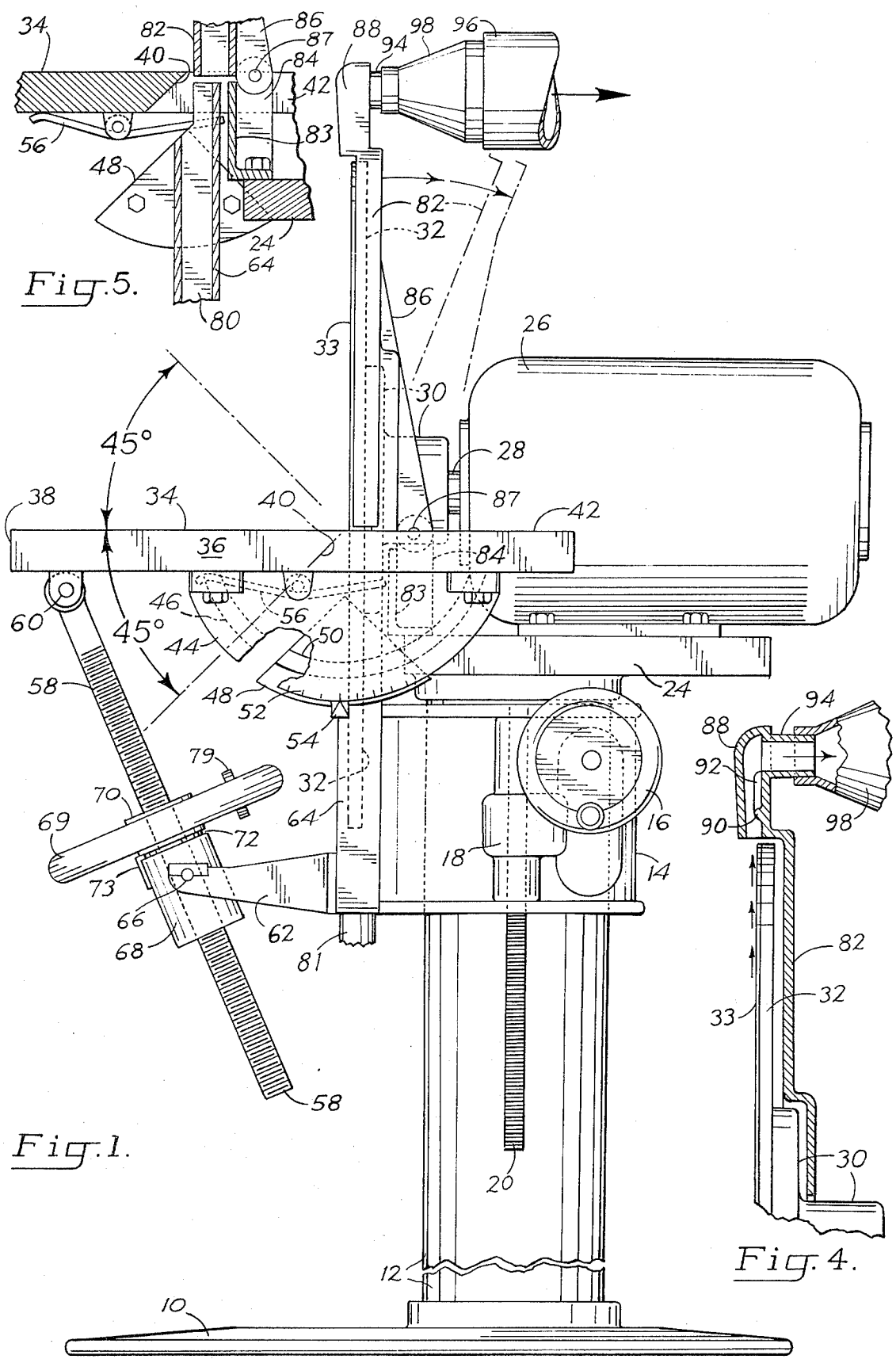

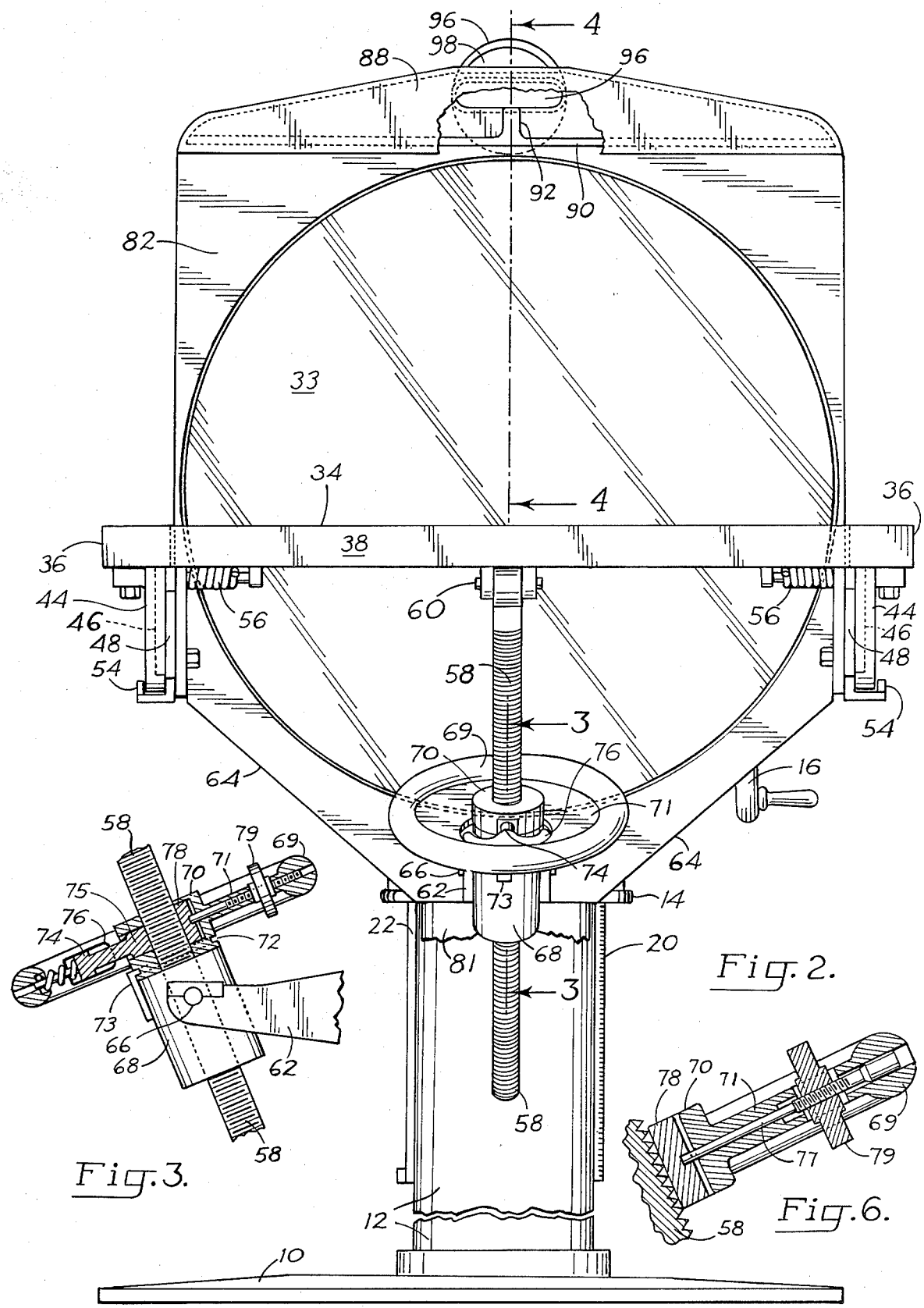

ROTARY DISC SANDER WITH TILTABLE WORK SUPPORT TABLE AND SANDER DUST COLLECTION UNIT

BACKGROUND AND GENERAL STATEMENT OF THE INVENTION

This invention pertains to rotary disc sanders. It pertains particularly to rotary disc sanders provided with tiltable work tables and sander dust collection units.

Rotary disc sanders of the class to which the present invention is directed are of widespread use in machine shops and pattern shops for working the surfaces of wood, metal and plastic work pieces. They are illustrated by the following prior art patents:

| U.S. Pat. No. | Inventor | Title |
| --- | --- | --- |
| 1,029,882 | Miller, J. Jr. | DISC GRINDER |
| 1,404,605 | Hansen, J. C. | SURFACE GRINDING MACHINE |
| 2,787,872 | Parker, J. W. | ADJUSTABLE WORK TABLE FOR GRINDING MACHINE |
| 2,865,149 | Soave, M. | WORK HOLDING ATTACHMENT FOR GRINDERS |

It is the general purpose of the present invention to provide a rotary disc sander which overcomes disadvantages inherent in the operation of the foregoing and other prior art sanders in that it is provided with a unique tiltable work support table and sander dust collection unit. The table is characterized by three points of suspension. It is rigid and infinitely adjustable, thereby making possible accurate control of the sanding operation.

The table furthermore is provided with means for locking it at any desired angle and with a latch which permits quick release. It is supported uniformly and accordingly cannot be twisted even when it bears a heavy load. It also is free from spring under heavy load. It is provided with automatic stops for adjusting the table level to an angle of 45° relative to the sander disc for quick adjustment to that commonly used angle.

As a result, it is possible to produce more accurate work at an increased production rate with reduced risk of breakage, no matter when the nature of the work piece may be.

Still further, the sander of my invention is provided with a sander dust collector which distributes the dust uniformly through the collection system so that the system does not plug up. It collects the dust efficiently with the result that the sander operators are free from the unpleasantness and hazard attendant upon working in an atmosphere of sander dust pollution.

Generally stated, the rotary disc sander of my invention having the foregoing advantages comprises in combination a base, a motor-driven, vertically arranged sander disc mounted on the base, and a horizontally arranged, tiltable work table assembly.

The latter assembly comprises a table having side, front and back margins. Pivotal table mounting means mount the opposite side margins of the table to the base with the back table margin adjacent and substantially parallel to the plane of the sander disc. Associated table-tilting screw means are mounted one end to the base and the other pivotally to the front margin of the table.

A shroud encircles the sander disc, enclosing the back and side margins thereof. The shroud communicates with a superimposed hood through a baffled duct which distributes the sander dust as it enters the duct, prevents plugging of the latter, and permits efficient collection of the dust.

DESCRIPTION OF THE PREFERRED EMBODIMENT OF THE INVENTION

In the drawing:

FIG. 1 is a view in side elevation of the hereindescribed rotary disc sander, parts being broken away for clearer illustration.

FIG. 2 is a front elevation of the sander.

FIGS. 3 and 4 are detailed sectional views taken respectively along lines 3—3 and 4—4 of FIG. 2.

FIG. 5 is an enlarged fragmentary sectional view of the central portion of FIG. 1, illustrating the work table and shroud supports.

FIG. 6 is an enlarged fragmentary view similar to FIG. 3.

The rotary disc sander of my invention basically comprises four sub-assemblies: The mounting base, the sander disc and associated drive, the work table and associated adjustment, and the sander dust collection unit.

Referring to the drawings, the base includes a pedestal 10 which supports a vertical post or column 12. The post mounts a vertically slidable carriage 14 which is adjustable incrementally by a conventional hand wheel 16 with gearing 18, rack 20 and key 22.

The sander disc and its associated drive also are mounted on post 10.

The top of the post supports a platform 24 to which is bolted drive motor 26. The shaft 28 of the motor is fixed to a stepped hub 30. The latter mounts a conventional sander disc 32 to which the emery paper or sand paper 33 is affixed in the usual manner.

The work table sub-assembly includes the table and its mounting, as well as means for its tilting angular adjustment to precisely the desired angle.

Table 34 is generally rectangular in plan and is provided with opposite side margins 36, front margin 38, and back margin 40. The latter is linear, located immediately adjacent the center of sander disc 32 and is parallel to the plane thereof.

A pair of spaced, rearwardly extending arms 42, one on each side of the table, provide a mounting for the table support.

The latter includes a pair of arcuate plates 44 having arcuate guideways 46 on their inner surfaces. The guideways are semi-circular with the center of the circle coincident with the back margin of the table. The ends of the guideways are open and abut against the undersurface of the table which accordingly provides a stop.

An angular support plate 48 mounting arcuate slides 50 is mounted on a stationary, vertical, structural plate 64 secured to carriage 14.

The outer edge of support plate 48 subtends an angle of 90°. Slides 50 slidably engage guideways 46 and are proportioned so that during the angular tilting travel of table 36 one end of the slides will abut the undersurface of the arms 42 of the table when the latter is in its fully elevated position whereas the other end of the slides will abut against the underside of the table when the latter is in its fully depressed position. The former position is plus 45° with respect to the horizontal and the latter is minus 45° with respect to the horizontal, as illustrated by the arrows of FIG. 1. This makes it possible to adjust the table to its 45° positions rapidly and accurately.

The outer faces of mounting plates 44 are marked with protractor indicia 52. The lower margins of stationary support plates 48 mount fingers 54 which indicate the angular position of table 34.

A grasshopper spring 56 is secured to each side of the undersurface of table 34. One of its legs bears against the underside of the table. The other is retained by frame member 64, FIG. 5. This spring serves as damping means for damping the descending movement of the table upon its quick release.

Cooperating with the slide-guide support assemblies located on each side of the table, described above, is table tilting screw means which serves the dual functions of supporting the outer portion of the table and of adjusting its angle of tilt. The construction of this member of the assembly is shown particularly in FIG. 3.

A long screw 58 extends from the underside of the outer portion of table 34 downwardly and inwardly below the level of carriage 14. The upper end of the screw is pivotally connected to the underside of the front margin of the table by means of a pivot pin 60. The lower portion of the screw is supported on a pair of brackets 62 connected to structural plate 64. The latter is fixed to carriage 14 and supports also angular slide support plates 48. The outer ends of brackets 62 are attached through pivot pins 66 to a sleeve 68 slidably mounted on screw 58.

A hand wheel 69 with hub 70 and intermediate web 71 also is mounted on screw 58, above sleeve 68. Hub 70, like sleeve 68, slides freely on screw 58. Its lower margin is provided with an annular groove 72. A keeper or retainer 73 is bolted or welded to the outer surface of sleeve 68. Its hook-shaped upper end enters groove 72 in the hub and rotatably couples the latter to the sleeve.

Means are provided on hand wheel 69 for driving screw 58, for frictionally restraining the hand wheel from free wheeling on the screw, and for enabling its quick release when it is desired to tilt the table to its stop positions. The means for driving the screw with the hand wheel and for obtaining the quick release of the latter are illustrated particularly in FIGS. 2 and 3.

A spring pressed plunger 74 is mounted radially in the hand wheel. Its head 75 slides in a radial guide provided in hub 70. The inner end surface of the head is threaded and engages screw 58. It is the only part of the hand wheel assembly that engages the screw, hub 70 and sleeve 68 being freely slidable thereon. The plunger head thus serves as a nut which, upon rotation of the hand wheel, extends or retracts the screw, thereby incrementally tilting work table 34.

When it is desired to adjust table 34 upwardly or downwardly against the 45° stops above described, spring pressed plunger 74 may be retracted by pulling on associated finger grips 76. This retracts threaded head 75 of the plunger against the tension of the associated spring. The screw then will slide freely until the table comes up against one stop area of the table, or the other.

The means provided on the hand wheel for frictionally restraining it from free wheeling are illustrated in FIGS. 1 and 6.

A threaded pin 77 is mounted radially in the hand wheel. Its inner end is connected to a brake block 78. The inner surface of the brake block frictionally engages the threads of screw 58. A nut 79 is threaded on the threaded portion of the pin and serves to advance and retract brake block 78 into and out of frictional engagement with the screw. The desired amount of resistance thus can be applied to the turning of the hand wheel.

The sander dust collection sub-assembly comprises broadly a shroud for collecting the dust and a hood for transmitting it to a source of vacuum.

The shroud is in two segments. The lower segment 80 is built into structural support plate 64, FIG. 5. This in turn is fixed to carriage 14 and supports arm 62 as well as slide mounting pieces 48. A duct 81 communicates with the interior of the lower shroud segment.

The upper shroud segment 82 is pivoted for angular movement as illustrated by the dashed line of FIG. 1. This makes possible servicing the sander, as by renewing the sandpaper on the sanding disc.

To this end there is provided an angle iron 83, FIG. 5, which extends laterally almost the entire width of the sander disc and which serves the ancillary function of providing a shield for the variable space between the upper and lower shroud segments. Angle iron 83 is bolted to motor platform 24.

A pair of standards 84 are welded to the angle iron and extend vertically upwardly. These lap gussets 86 which are fixed to the back of the upper shroud segment 82. Pins 87 form a hinge connection between these two units.

A hood 88 is positioned on top of upper shroud segment 82 and communicates therewith, FIG. 4. The hood extends across the top of the shroud, as shown in FIG. 2. It is formed with a longitudinal baffle 90 which extends the length of the hood. It also is provided with a central vertical baffle 92 which divides the hood into two substantially equal portions. These baffles have the effect of dividing the flow of sander dust, creating turbulence, and preventing channeling of the dust in such a manner as to plug the unit.

Hood 88 is provided with a port 94 which in turn is connected to the vacuum exhaust line 96 through an adapter 98. Lower conduit 81 also is connected to vacuum exhaust line 96 for ultimate disposal of the sander dust.

OPERATION

The operation of the hereindescribed rotary disc sander is as follows:

Work table 34 is set at the correct elevation to handle the selected work piece by adjusting the elevation of carriage 14 by means of hand wheel 16. The table is set at the desired angle by operation of hand wheel 69. Brake block 78 is tightened against the screw 58 to prevent rotation of the hand wheel and thereby maintain the table at its desired setting.

If a setting of 45° is desired, either upwardly or downwardly, the table is moved until slides 50 abut against the underside of table 34 or of the arm extensions 42 thereof.

To achieve this rapid adjustment to either 45° setting, spring pressed plunger 74 is retracted by means of its finger grip 76. This releases the threaded head of the plunger from engagement with screw 58, permitting the screw to slide freely through hub 70 and sleeve 68.

Vacuum applied to exhaust line 96 is transmitted both to hood 88 communicating with upper segment 82 of the shroud and, through conduit 81, to lower segment 80 of the shroud. Hood 88 with its associated horizontal and vertical baffles, 90 and 92, respectively, makes uniform the vacuum applied to the upper part of the shroud, thereby preventing channeling of the sander dust and plugging of the conduits.

When it is desired to service the sander disc, for example to replace sandpaper 33, the upper shroud may be tilted back to the dashed line position of FIG. 1, pivoting as it does so about pivot pins 87. Vertical adjustment of work table 34 to accommodate work pieces of various dimensions may be accomplished in the usual way by adjusting the vertical position of carriage 14 with hand wheel 16.

Having thus described my invention in preferred embodiments, I claim:

1. In combination with a sander having a base and a motor driven sanding member mounted on the base for movement of its work sanding surface in a vertical plane, a work support table assembly comprising:
   (a) a carriage mounted on the base for movement vertically with respect to the sanding member,
   (b) a table having side, front and back margins,
   (c) a pair of interengageable table mounting pivot means on the carriage and table located laterally outward of the opposite sides of the sanding member and adjacent the back ends of the side margins of the table for mounting the table for pivotal movement about an axis disposed substantially parallel to and closely adjacent the back margin of the table and the vertical sanding plane of the sanding member,
   (d) an elongated table supporting and tilting screw secured pivotally at its upper end to the underside of the table adjacent the front margin and midway between the side margins thereof, and
   (e) coupling means on the carriage engageable releasably with the screw for securing the table releasably in selected positions of angular adjustment of its work supporting surface relative to the work sanding plane of the sanding member.

2. The combination of claim 1 wherein the table has a pair of laterally spaced arms extending rearwardly of the back margin of the table on opposite sides of the sanding member, and each of the table mounting means comprises arcuate slide and guideway members one secured to the carriage and the other to the underside of the table.

3. The combination of claim 2 wherein the slide and guideway members are arranged such that the limits of tilting movement of the table are defined one by the abutment of the underside of the table against one end of the slide or guideway member secured to the carriage and the other by abutment of the underside of the arm against the opposite end of the member secured to the carriage.

4. The combination of claim 2 including cooperative indicator and protractor indicia means on at least one of the pair of slide and guideway members for indicating the angle of tilt of the table.

5. The combination of claim 1 wherein the coupling means comprises:
   (a) a sleeve freely encircling the screw and mounted pivotally on the carriage,
   (b) a hand wheel freely encircling the screw and mounted on the sleeve relative to the latter,
   (c) a plunger mounted on the hand wheel for rotation therewith and for radial reciprocation relative thereto, and
   (d) a threaded head on the inner end of the plunger arranged for releasable engagement with the screw.

6. The combination of claim 5 including adjustable friction brake means on the hand wheel arranged for releasable engagement with the screw for securing the hand wheel releasably against rotation relative to the screw.

7. The combination of claim 1 wherein the sanding member is a sander having a front flat work sanding surface and the combination includes a shroud substantially surrounding the back, top, bottom and sides of the sander and exposing the flat front work sanding side of the sander, the shroud being formed of a top section secured to the base and a bottom section secured to the carriage, and vacuum exhaust means communicating with the shroud for collecting and exhausting sander dust produced by operation of the sander.

8. The combination of claim 7 including:
   (a) a hood extending across the top of said top section of the shroud and communicating with the latter,
   (b) a duct centrally of the hood communicating the hood with said vacuum exhaust means,
   (c) a horizontal baffle in the hood extending the length thereof, and
   (d) a vertical baffle in the hood centrally thereof for dividing the flow of sander dust to the duct.

* * * * *